United States Patent Office 3,380,967
Patented Apr. 30, 1968

3,380,967
POLYETHERS AND POLYURETHANES
OBTAINED THEREFROM
Arnold John Lowe, Altrincham, Edwin Fenton Chandley, Hazel Grove, and Lelio Molinario, Eccles, England, assignors to Lankro Chemicals Limited, Eccles, Manchester, England, a British company
No Drawing. Filed Jan. 6, 1964, Ser. No. 336,021
Claims priority, application Great Britain, Jan. 11, 1963, 1,470/63
5 Claims. (Cl. 260—77.5)

ABSTRACT OF THE DISCLOSURE

The present invention is directed to polyurethane polymers which are prepared by reacting an organic isocyanate or an organic isothiocyanate with a particular type mixture of polyether polyols having molecular weights in the range of 1000 to 6000. The polyethers, which are in themselves one feature of the present invention, contain from two to six hydroxy groups per molecule. The ethers are copolymers of ethylene oxide, propylene oxide and a polyhydric alcohol and are so prepared that (1) the polypropylene residues represent from 80 to 97% by weight of the total alkylene oxide content, and (2) the terminal blocks of the copolymers are composed of propylene oxide residues only which blocks constitute at least 3% by weight of the total propylene and ethylene oxide residue content of the molecule.

---

This invention relates to novel polyhydroxy terminated polyethers and polyurethanes obtained therefrom. By "polyurethanes" is meant the reaction products of the said polyethers with organic poly-isocyanates or thio-isocyanates; the reaction may be effected in the presence of other compounds, usually organic compounds, containing more than one reactive hydrogen atom.

Polyurethanes have been made on a large scale from toluene diisocyanates and polyethers having two or three hydroxy groups; such polyethers have been, for example, a glycerol based polyoxypropylene triol of mole weight of 3000 to 4000, or a polyoxypropylene diol of mole weight 1000 to 2000 or a mixture of two alcohols, both alcohols being polymerisation products of 1:2 propylene oxide.

It has also been proposed to make polyurethanes from copolymers of 1:2 propylene oxide and ethylene oxide of molecular weights 2000 to 5000 in which the ethylene oxide residues form a terminal block. Such products have been difficult to process although they react very quickly and elastomeric foams produced therefrom have not been very satisfactory.

Many polyethers have been proposed as intermediates for polyurethanes, but only a surprisingly small number have been found which give polyurethanes which possess the generally desired physical properties.

One object of the invention is to provide a new and useful intermediate for the manufacture of polyurethanes.

It has now been found that novel polyether-alcohols can be made which give prepolymers with good storage life yet rapid cure and one shot flexible foams with easy processing characteristics, wide tolerance on catalyst and improved physical properties by making copolymers of ethylene oxide and propylene oxide of such a structure that all the terminal groups of the alcohols are derived from 1:2 propylene oxide and are consequently similar in reactivity, yet because of the ethylene oxide content are sufficiently hydrophilic to promote easy mixing of the poly-iso-cyanate, poly-hydroxy-compound and water.

According to the present invention there is provided a polyether polyol containing two or more hydroxy groups said ether comprising block copolymers of the alkylene oxide, ethylene oxide and 1:2 propylene oxide with water, dihydric or polyhydric alcohols, and having a molecular weight in the range 1000 to 6000 in which not less than 80% and not more than 97% of the alkylene oxide consists of 1:2 propylene oxide and in which at least 3% of the 1:2 propylene oxide is present as terminal blocks.

According to the present invention there is further provided a process for preparing a polyurethane compound which process comprises reacting a polyfunctional organic isocyanate or iso-thio-cyanate of general formula $R(NCX)_{n+1}$, where R is an organic radical, X is an oxygen or sulphur atom and $n$ a positive integer, with a polyether polyol ether containing two or more hydroxy groups, said polyether polyol ether consisting of block copolymers of the alkylene oxides, ethylene oxide and 1:2 propylene oxide with water, dihydric or polyhydric alcohols and having a molecular weight of between 1000 and 6000 in which not less than 80% and not more than 97% of the alkylene oxide consists of 1:2 propylene oxide and in which at least 3% of the 1:2 propylene oxide is present as terminal blocks. The invention also includes polyurethane compounds made according to this process.

In one preferred form of the process, the polyether polyol and the isocyanate are reacted in the presence of water preferably in a concentration of from 1–3% so as to produce a polyurethane foam rubber.

The polyether polyols are preferably made by reacting ethylene oxide and 1:2 propylene oxide with conventional low mole weight initiators which may include ethylene glycol, 1:2 propylene glycol, diethylene glycol to produce dihydroxy terminated polyethers; glycerol, trimethylol propane, hexane triol to produce triols; pentaerythritol, alpha methyl glucoside to produce tetrols and sorbitol to produce hexols.

The preferred polyether polyols are diols with mole weights of 1000–3000, more preferably 1000 to 2000, and triols with mole weights between 2500 and 4500, more preferably 2700–4000. It is also preferred that they contain between 5 and 20% by weight of oxyethylene residue and in which the terminal block contains 5–15% of oxypropylene residues.

Even more preferably the oxyethylene content should lie between 6 and 10% by weight and be present as the penultimate block and the terminal block should contain 5 to 10% by weight of oxypropylene residues.

The position of the oxyethylene units may be varied considerably and may be illustrated by one of the preferred triols based on glycerol of mole weight of approximately 3500.

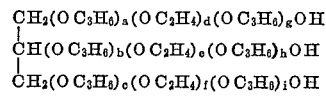

wherein $a$, $b$, $c$, are zero or positive integers and $d$, $e$, $f$, $g$, $h$, $i$, are positive integers.

Where $$a+b+c=p$$
$$d+e+f=q$$

and $$g+h+i=r$$

the mole weights of the triol is $$92+44q+58(p+r)=M=3500$$

(in this illustration). The weight of the oxyethylene residues is $44q$, the weight of the terminal block is $58r$; the weight of the antipenultimate groups when present is $58p$. The weight percent of alkylene oxide residues that are $$\text{oxyethylene} = \frac{4400q}{44q + 58(p+r)}$$

and the weight percentage of the terminal block is defined $$\frac{5800r}{44q + 58(p+r)}$$

The individual values of $p$, $q$ and $r$ are defined by the mole weight of the triol and the criterion above. The conventional batch polyaddition of alkylene oxide to alcohols makes it easy to vary the position of the oxyethylene residues, thus in one form of the invention, the block represented by $p$ may be omitted and the 5-20% oxyethylene block placed next to the initiator, when the terminal block becomes 95-80% oxypropylene residues. At the other extreme, $p$ may represent an antipenultimate block representing 65-90% of the alkylene oxide residues as oxypropylene residue, $q$ the penultimate block of 5-20% oxyethylene residues and $r$ the terminal 5-15% oxypropylene block. Provided the size and composition of the final block is maintained, the penultimate and antipenultimate blocks represented by $p$ and $q$ may be split and mixed into a series of smaller blocks or even converted to a random copolymer by feeding a mixture of ethylene oxide and propylene oxide in the desired ratio to the reactor.

The novel polyols may be used alone, in admixture with other polyols of the present invention or in admixture with conventional oxypropylene based polyols.

The polycondensation of the alkylene oxide with the initiator is preferably done in the presence of an alkali-metal catalyst which ensures that most of the terminal hydroxy groups are secondary in nature. Such catalysts include sodium or potassium metal dissolved in the initiator to give sodium or potassium alkoxide, sodium or potassium methoxide, caustic soda or caustic potash.

The organic isocyanate $R(NCX)_{n+1}$ may be an aliphatic, aromatic or cyclo-aliphatic compound and may contain substituent groups provided that such groups do not interfere with the reaction. The preferred isocyanates or thioisocyanates are those in which $n=1$ or 2, those in which $n=1$ being more preferred. Examples of such compounds are polymethylene di-isocyanate and di-thioisocyanate, hexamethylene di-isocyanate, xylene di-isocyanate, naphthylene di-isocyanate, 1 methyl 2:4 phenylene di-isocyanate; mixed isomers of 1 methyl 2:4 phenylene di-isocyanate and 1 methyl 2:6 phenylene di-isocyanate, 4,4' di-isocyanato di-phenyl methane. The preferred products are those derived from the aromatic di-isocyanates and in particular from toluene di-isocyanate containing about 80% of the 2:4 toluene di-isocyanate and 20% of the 2:6 toluene di-isocyanate.

It will be appreciated that the novel polyether polyols possess mainly secondary alcohol groups which are relatively remote from that part of the molecule which is hydrophilic and react with isocyanate groups at the same speed as those polyethers based on 1:2 propylene oxide only, thus the chain elongation reaction in prepolymer formation is, for example, as follows:

$nHOR_1OH + (n+1)OCNRNCO \longrightarrow$

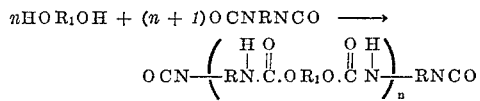

and the storage life time of the prepolymer is unimpaired.

In one form of the invention, the polyurethane resin may be the prepolymer manufactured by reacting the polyether polyol with a stoichiometric excess of polyfunctional isocyanate or thio-isocyanate, under such conditions that the ratio of NCX groups to OH groups is greater than 1.5:1 to give isocyanate terminated reactive prepolymers. It is even more preferably that RNCX shall be toluene di-isocyanate and the ratio of NCO:OH be between 1.5 and 2.5 and that the interaction shall be carried out in the presence of 0.1% by weight of water (based on the polyether); the reaction is desirably carried out by heating the reactants to a temperature of 80-120° C. for a period of 30-240 minutes. These reactive intermediates may with advantage be converted to other urethane derivatives.

The nature of these reactive prepolymers can be varied considerably according to the ratio of NCO groups to hydroxy groups and the type of polyether polyol or mixtures of polyol ethers that are used. Diols alone with toluene di-isocyanate give substantially linear intermediates which in their ultimate forms give soft products. Triols give reactive intermediates which have at least three branch chains each terminated by an isocyanate group and which may be highly branched and which can produce hard resins when finally reacted. By suitable combination of diols and triols products of intermediate properties can be produced. In general, any given reactive intermediate can be hardened by the incorporation of minor amounts of low molecular weight polyhydric alcohols such as ethylene glycol, trimethylol propane, neopentyl glycol, pentaerythritol, sorbitol, and they may be softened or plasticised by the incorporation of a minor molar proportion of a mono-hydric alcohol as typified by the formula $R'(OC_2H_4)_a(OC_3H_6)_bOH$, where $a$, $b$ are zero or positive integers and $R'$ is a hydrocarbyl radical, e.g., butanol, octanol, cetyl oleyl alcohol or nonyl phenol. In making these additions, care must be taken to achieve good results to maintain the overall ratio of NCX:OH of not less than 1.5:1. Additionally the reactive prepolymer may be used in an undiluted form or admixed with further quantities of di or polyfunctional isocyanates or the isocyanates of the same or a different type. The intermediate either alone or in admixture with extra isocyanate, may be used as prepared or may be diluted in a solvent which is substantially non-reactive to the isocyanate groups, e.g., toluene, xylenes, mixed hydrocarbon fractions, or carbon tetra-chloride, ethyl acetate, or the acetate of ethylene glycol monoethyl ether.

When it is desired to keep the reactive intermediate for a considerable period of time, it is advantageous to effect their preparation in the presence of small qauntities of up to 0.01% of an acyl chloride, e.g., acetyl chloride, benzoyl chloride, chlorobenzoyl chloride. Alternatively, the prepolymer may be made in a solvent.

The invention may be used in a method of applying prepolymer wherein the solution of the reactive prepolymer is used as a surface coating agent and applied to wood, metal or leather to give clear top coats or varnishes. The curing of the reactive intermediates may be catalysed or non-catalysed. The solvent is preferably evaporated from the film applied to the surface to be coated and the reactive intermediate is cross-linked by the reaction of the terminal NCO groups with atmospheric moisture or reactive groups in the substrate. The novel polyether polyols are particularly effective in the applications of the invention as they are slightly hydrophilic; they facilitate the absorption of atmospheric moisture but give a cured film that has good hydrophilic stability. Many possible variants of this system will be apparent to those skilled in the art.

Another useful application of the invention is in the partial impregnation of leather to improve the wearing properties of leather. In this case, the reaction intermediate in part reacts with groups of the leather fibre and in part is crosslinked by reaction with water.

The reactive intermediate may be cured to give a rubber which may be cast into a convenient shape. Suitable curing agents are compounds possessing two or more groups which are capable of reacting with the terminal isocyanate groups of the reactive intermediate. Examples of such compounds include materials having two or more of the following groups: hydroxyl, primary amine, secondary amine, and carboxylic. Such compounds include ethylene glycol, 1,4-butane diol, ethylene diamine, hexamethylene diamine, diethylene triamine, m-phenylene diamine, 2-amino-1-naphthol, 2-amino ethyl alcohol, amino benzoic acid, amino acetic acid, hydroxy acetic acid, 4,4'-diamine-3,3'-dichloro diphenyl methane.

The novel polyether polyols may be converted to prepolymers for flexible urethane foams by any of the conventional techniques. For example 1.1 equivalents of isocyanate groups, usually in the form of 80% 2:4 toluene di-isocyanate, 20% 2:6 toluene di-isocyanate, are heated with each equivalent of hydroxy group in the polyol at 105° C. for about 2–3 hours until the viscosity has reached a desired limit (frequently 300 centipoises at 105° C.). To the mixture at 105° C. is added excess isocyanate to bring the free isocyanate content to 8–10%. The free isocyanate content may be determined by titration with dibutylamine and is expressed at the weight percentage of NCO groups on the total weight. The prepolymer is desirably cooled to about 20° C. and has a viscosity of 10,000–25,000 centistokes depending on its composition. It may be converted to a flexible urethane foam by reacting about 100 parts of the prepolymer with 2.5 parts of water in the presence of tertiary amine catalyst which may be with advantage 1 part of N-methyl morpholine and 0.5 part of triethylamine. Up to one part of a water insoluble silicone oil of low viscosity should be incorporated in the reaction mixture as foam stabiliser. The water-insoluble silicone oil is preferably a polymethyl siloxane having a viscosity in the range 10–100 centistokes at 25° C., the preferred silicone oil having a viscosity of 50 centistokes at 25° C. These foams require several hours curing at 120° C. before they develop their full strength. The presence of the oxyethylene fragment facilitates the still difficult mixing of the small quantity of water and catalyst with the mass.

The foams may be made with good energy absorbing properties and low resilience so as to be suitable for crash parts in cars. The prepolymer technique is of value as it is possible to use two different isocyanates of greatly different reactivity as the time and temperature of the prepolymer preparation can be varied. It is still desirable that the diluting isocyanate shall be 2:4/2:6 toluene di-isocyanate (80/20 ratio). In an analogous manner, polyols with greatly differing reactivities can also be accommodated by this technique.

The greatest need for and value of our invention is in the field of one-shot urethane flexible foam in which additional chain extension reactions involving simultaneous blowing of the polymer mass by carbon dioxide evolution occurs through the reaction of isocyanate groups and water as follows:

$$2\text{—R·NCO} + \text{H}_2\text{O} \rightarrow \text{—RNH·COHNR—} + \text{CO}_2$$

Crosslinking reactions follow through reaction of the substituted ureas formed in this above reaction with excess isocyanate groups as depicted below:

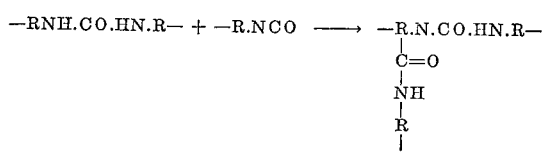

Auxiliary blowing may be accomplished simultaneously using volatile halogenated hydrocarbons such as methylene dichloride or trichlorofluoromethane, or mixtures of such materials.

The preferred catalysts are those in current use to produce commercial foams and include tertiary amines such as 1,4-diaza, bicyclo octane, N,N'-tetramethyl 1:3 butane diamine, N-methyl morpholine; organo tin catalysts such as dibutyl-tin dilaurate; and stannous salts such as stannous octoate. The catalysts may with advantage be used as binary, ternary or even more complicated mixtures. When using stannous octoate—diaza, bicycle octane formulations, the overall catalyst concentrations can be reduced by 20–30% when the new polyether polyols are substituted for a conventional polyoxypropylene-based triol of similar mole weight.

The preferred foam stabilisers are the polysiloxane polyoxyalkylene block copolymers such as silicone oil L-520, a product believed to have the following composition:

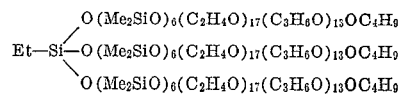

The presence of the hydrophilic part of the new polyether polyols, permits rapid mixing with both the isocyanate and organo-tin or stannous salt on the one hand and the amine catalyst, silicone oil and water on the other hand, the last three components generally being added as an aqueous solution. It has been found that at standard mixing times, the speed of the mixer stirrer can be reduced to 60% of that used for polyoxypropylene based polyols of similar molecular weight. The foaming reaction is remarkably easy and in contradistinction to polyoxypropylene triols of mole weight 3500 and upwards, it is quite easy to obtain a uniform foam structure.

It has now proved easy to obtain foams which are harder by increasing the densities, or softer by reducing the densities preferably by the incorporation of trichlorofluoromethane as a blowing agent. The foams possessed excellent resilience and considerably better tear strength and elongations at break when compared with similar density commercial foams which are made from polyoxypropylene triols.

The foams made in the following examples were tested according to the following standard methods:

Compression set

British Standard Specification No. 3,379/61 in which the sample is compressed to 25% of its original height and maintained at 70° C. for 22 hours. After recovery, the loss in height is recorded as a percentage of the original height.

Elongation at break and tensile strength

British Standard Specification No. 3,379/61. Tests were carried out on standard foam, after heat aging for 16 hours at 140° C. and humidity aging in a steam autoclave for 3 hours at 105° C.

Hardness

British Standard Specification No. 3,379/61. except that a flat disc having an area of 50 sq. inches was used. Samples were 2″ thick.

Resilience

Dropping ball technique: results as bounce height as a percentage of drop height.

Tear strength

Samples 6″ x 1″ x 1″ were cut 1½″ deep. The two segments were pulled apart at a jaw speed of 2″ per minute.

The following examples illustrate the invention.

EXAMPLE 1

A low mole weight glycerol/1:2 propylene oxide condensate of mole weight 572 and hydroxy value 294, Mgms. of KOH/gm. was made by reacting glycerol with 1:2 propylene oxide in the presence of potassium hydroxide as catalyst. 40.5 lbs. of this unneutralised material were charged to a stirred autoclave equipped with heating and cooling devices. The air was purged by nitrogen and 1.2 lbs. of 70% aqueous caustic potash added. The stirred mixture was heated under vacuum and maintained at about 115° C. 186 lbs. of propylene oxide were now pumped in at such a rate as to maintain the temperature at about 115° C. and the pressure at 50 lbs./sq. inch. After the addition was complete, the vessel was stirred until the reaction pressure had fallen to 2 lbs./sq. inch. The vessel was evacuated, purged with nitrogen and a 45 lb. sample run off for analysis and test purposes. The product was neutralised, filtered and found to have hydroxyl value of 56.3 corresponding to a molecular weight of 2990. The residual polyol was evacuated again and reacted over the course of an hour with 18 lbs. of ethylene oxide and evacuating briefly after the pressure had fallen to zero lbs./sq. inch. A further 18 lbs. of 1:2 propylene oxide were now charged causing the pressure to rise to 24 lbs. per sq. inch. When the pressure had again reached zero, the vessel was evacuated, purged with nitrogen and the product neutralised and filtered. The mass yield based on materials charged was 98%. The hydroxyl value of the product was 47.4 corresponding to a molecular weight of 3550. It was calculated that the initial block of 1:2 propylene oxide residues including the 1:2 propylene oxide residues arising from the low mole weight polymer was 83.5% of the alkylene oxide residues, the penultimate block of ethylene oxide residues was 8.3% and the final propylene oxide block was 8.2%. Physical properties are given in Table 1. Physical properties differentiating the new products from conventional polyoxypropylene based triols and lightly tipped materials with ethylene oxide are higher specific gravities, the ability to dissolve more water and a higher cloud point.

In the preparation of one-shot urethane foams reference is made to the T.D.I. index. This term defines the excess of toluene di-isocyanate employed in the formulation over and above the stoichiometric requirement of the hydroxyl containing bodies, their acidities, water contents and additional water employed to produce carbon dioxide for expansion of the foams. The quantity of toluene di-isocyanate T in parts by weight required to react with 100 parts by weight of a polyether having:

mg. KOH/gm.
Hydroxyl value ------------------------------ H
Acid value --------------------------------- A
Water content (weight percent) in a formulation employing additional water (in parts by weight per 100 of polyether) ------------------------------- W is given by:

$$T = \frac{\text{T.D.I. Index}}{100} [0.155 \times (H+A) + 9.67(W+w)]$$

Unless otherwise stated, percentages are weight percentages and parts are by weight.

The cloud point is defined as the temperature at which a solution of equal parts by volume of the test sample in a solvent consisting of equal parts by weight of isopropanol and water, becomes cloudy.

EXAMPLES 2 TO 6

The products all have molecular weights of about 3500 and were prepared in a manner similar to Example 1. Conditions were altered to vary the position and size of the three blocks. The physical properties show, in Table 1, that the cloud point and water absorption rise rapidly with the ethylene oxide content and also with the proximity of the oxyethylene block to the end of the terminal hydroxyl groups.

EXAMPLE 7

A sample of the low mole weight polymer used in Example 1 was reacted in a similar manner to Example 1 except that the 40 lbs. of low mole weight polymer were reacted with 186 lbs. of a mixed oxide feed containing 90% w/w of 1:2 propylene oxide and 10% ethylene oxide before a terminal block of 1:2 propylene oxide was applied. Thus, the product again of mole weight 3600, had an overall content of 7.8% oxyethylene residues which were randomly distributed with 69.9% of oxypropylene residues. The terminal block consisted of 8.6% oxypropylene residues and the block adjacent to the initiator consisted of 13.7% oxypropylene residues.

EXAMPLES 8 and 9

These were carried out in a manner similar to Example 1 except that the charges were adjusted to give products of mole weight 3130 and 4940 respectively.

EXAMPLE 10

4 parts of sodium metal were dissolved, in 900 parts of 1,4-butane diol and reacted with 1320 parts of ethylene oxide followed by 9500 parts of 1:2 propylene oxide in a manner similar to that used in Example 1. The product has a molecular weight of 1040.

EXAMPLE 11

Flexible foams were made from the polyethers produced in Examples 1–9 by the one shot process. The foam made from the polyether of Example 1 was compared in detail with a foam made from a polyoxypropylene based triol. Three different formulations were compared. All the foams has a good fine structure free from closed cells as exemplified by the ease with which one could blow through them. All foams recovered rapidly from the deformation by twisting. The formulation and results are set forth in Table 2. All foams were made by machine mixing.

TABLE 1.—PROPYLENE-ETHYLENE OXIDE, GLYCEROL BASED BLOCK COPOLYMERS

| Example | Percent oxide added to glycerol | | | OH.V. | Mole Wt. | Visc. at— | | | Visc. Index | RI at 25° C. | SG at 25° C. | Pour Pt.,°C. | Cloud Pt.,°C.[3] | Sol. in water at 25° C. | |
|---|---|---|---|---|---|---|---|---|---|---|---|---|---|---|---|
| | PO[1] Stage 1 | EO[2] Stage 2 | PO[1] Stage 3 | | | 100° C. (C.S.) | 37.7° C. (C.S.) | 25° C. (C.S.) | | | | | | Percent spl. in water to give first turbidity | Percent water in spl. to give first turbidity |
| 1 | 83.5 | 8.3 | 8.2 | 47.4 | 3,550 | 38.1 | 273 | 545 | 134 | 1.4520 | 1.017 | −34 | +35 | 0.08 | 6.2 |
| 2 | 91.2 | 4.4 | 4.4 | 50.9 | 3,310 | 40.3 | 285 | 561 | 135 | 1.4518 | 1.014 | −33 | +21 | 0.04 | 5.9 |
| 3 | 80.7 | 7.9 | 11.4 | 50.6 | 3,325 | 38.9 | 283 | 454 | 134 | 1.4530 | 1.011 | −34 | +30 | 0.04 | 5.9 |
| 4 | 14.8 | 8.62 | 76.6 | 47.9 | 3,520 | 39.1 | 288 | 571 | 134 | 1.4525 | 1.020 | −32 | +25 | 0.08 | 6.0 |
| 5 | 83.7 | 12.2 | 4.1 | 47.85 | 3,520 | 39.2 | 274 | 543 | 136 | 1.4525 | 1.022 | −33 | +49 | 0.08 | 40.0 |
| 6 | 80.1 | 15.35 | 4.55 | 47.3 | 3,560 | 40.7 | 289 | 550 | 134 | 1.4525 | 1.026 | −32 | +67.5 | 0.12 | 34.3 |
| 7 | 13.7 | [4]77.7 | 8.6 | 46.8 | 3,600 | 39.5 | 287 | 564 | 134 | 1.4525 | 1.012 | −34.5 | +21 | 0.08 | 5.5 |
| 8 | 78.7 | 10.5 | 10.8 | 53.8 | 3,130 | 31.1 | 233 | 613 | 134 | 1.4520 | 1.018 | −33.5 | +36 | 0.12 | 4.9 |
| 9 | 80.0 | 9.8 | 10.2 | 34.1 | 4,940 | 54.9 | 409 | 802 | 132 | 1.4520 | 1.017 | −31.5 | +32 | 0.046 | 3.7 |
| 10[5] | 0.0 | 12.2 | 87.8 | 108 | 1,040 | 10.1 | 80.4 | 148 | 122 | 1.4539 | 1.016 | −46 | +59 | 16.8 | 16.1 |

[1] Propylene oxide.  [2] Ethylene oxide.
[3] Temperature at which a 50/50 by vol. of sample and a mixture of 50/50 by weight of isopropanol and water, becomes cloudy.
[4] Mixture of 90% propylene oxide and 10% ethylene oxide.
[5] Oxide additions made to 1,4-butane diol.

TABLE 2.—PREPARATION OF FOAMS

[Foams 1,2 and 3 are based on the polyhydroxy terminated polyether of Example 1 (Table 1): hydroxyl value=47.4; average mol wt.=3550. Foams 4,5 and 6 are based on a polyoxypropylene triol of 56.1 hydroxyl value; average mol. wt.=3,000]

| Formulation [1] | Foam 1 | Foam 2 | Foam 3 | Foam 4 | Foam 5 | Foam 6 |
|---|---|---|---|---|---|---|
| Polyol | 100 | 100 | 100 | 100 | 100 | 100 |
| Toluene diisocyanate[2] (80/20) | 45.5 | 43.5 | 43.5 | 47.0 | 45.0 | 45.0 |
| Water | 3.6 | 3.4 | 3.4 | 3.6 | 3.4 | 3.4 |
| Trichlorofluormethane | 0.0 | 5.0 | 10.0 | 0.0 | 5.0 | 10.0 |
| Silicone Oil [3] | 1.0 | 1.2 | 1.4 | 1.0 | 1.2 | 1.4 |
| "Dabco" [4] | 0.1 | 0.1 | 0.1 | 0.125 | 0.125 | 0.125 |
| Stannous Octoate | 0.25 | 0.25 | 0.25 | 0.3 | 0.3 | 0.3 |
| Stirrer Speed, r.p.m. | 2,300 | 2,300 | 2,300 | 3,150 | 3,150 | 3,450 |
| Density of foam, g./cc. | 0.0271 | 0.0255 | 0.0236 | 0.0276 | 0.0252 | 0.0226 |
| Elongation at Break (percent): | | | | | | |
|   Initial | 293 | 304 | 253 | 228 | 193 | 207 |
|   After heat ageing | 293 | 304 | 295 | 251 | 227 | 237 |
|   After humidity ageing | 293 | 304 | 253 | 214 | 217 | 217 |
| Tensile Strength (lbs./sq. inch): | | | | | | |
|   Initial | 18.3 | 19.1 | 16.6 | 17.4 | 12.8 | 11.3 |
|   After heat ageing | 20.3 | 19.1 | 16.6 | 17.4 | 14.6 | 13.0 |
|   After humidity ageing | 18.3 | 18.1 | 15.0 | 15.1 | 12.8 | 11.3 |
| Tear Strength (lbs./linear 1") | 3.5 | 3.5 | 2.6 | 2.5 | 2.3 | 1.7 |
| Compression Set (percent) | 6.6 | 4.6 | 4.5 | 4.6 | 3.9 | 4.2 |
| Resilience (percent) | 45.3 | 46.5 | 50.6 | 43.2 | 44.6 | 43.1 |
| Load in lbs./50 sq. inch: | | | | | | |
|   At 25% deflection | 33.2 | 26.4 | 20.6 | 27.6 | 22.8 | 20.1 |
|   At 65% deflection | 66.0 | 54.1 | 42.2 | 53.2 | 45.3 | 41.1 |
| Ratio 65:25 value | 1.99 | 2.04 | 2.04 | 1.92 | 2.02 | 1.94 |

[1] Parts by weight per hundred of polyol.
[2] 108 Index throughout. (For definition see column 7, lines 33–55.)
[3] Silicone oil L 520.
[4] Diazabicyclo octane.

Flexible urethane foams were prepared from the polyethers described in Examples 2–7 using the same formulation employed for Foam 1 in Table 2. The quantity of 80/20 toluene diisocyanate varied slightly according to the hydroxyl values of the individual polyethers in order to maintain a toluene diisocyanate index of 108 throughout. In each case, foams of good structure were produced with no evidence of shrinkage due to the presence of an excessive proportion of closed cells. Closer examination of the type of foam structures produced by noting the facility for transmission of air through the foams indicated differences which correlated with the quantity and position of the oxyethylene units in the molecular structure.

The polyether of Example 6, containing 15.4% by weight of oxyethylene units based on the total alkylene oxides added and having 4.6% (on the same basis) of oxypropylene as terminal units was used to produce a foam using the formulation described for Foam 1 of Table 2, and 45.5 parts by weight of 80/20 toulene diisocyanate per 100 parts by weight of polyether. This foam possessed sufficient closed cells to be detected easily by touch and which was substantially impervious to the passage of air under low pressure. Foams of more open structure were made by slight variations in the formulation, for instance, by an increase in the Dabco level to 0.15 part by weight/100 of the polyether.

The polyether of Example 5 produced a foam which proved to be slightly more open to the passage of air. The oxyethylene block in this instance had been reduced to 12.2% by weight of the total oxides added during formation of the product. The oxypropylene terminal block corresponded to the addition of 4.1% by weight of total alkylene oxides. Again, a variation in the formulation as indicated for the polyether of Example 6, enabled the porosity to be improved.

At the other end of the scale, foams possessing an extremely open cell structure using the basic formulation were obtained by the use of the block copolymers of Examples 2 and 4. In the former case, the quantity of oxyethylene block component was small, namely 4.4% by weight on total oxides and was sited very similarly to the oxyethylene blocks in the polyethers of Examples 5 and 6.

The polyether of Example 4 differs appreciably from the above polyethers in the position of the oxyethylene units. In quantity it represents 8.6% by weight of the total oxides added and is situated at a very great distance from the terminal hydroxyl groups, as measured by the quantity of propylene oxide added as the final block, i.e., 76.6% by weight.

An extremely open cell structure was also obtained in a foam based on the polyether of Example 7 in which the distribution of oxyethylene/oxypropylene groups was random. The presence of a majority of terminal secondary hydroxyl groups was ensured by the addition of 8.6% by weight of propylene oxide after completion of the reaction involving the mixture of oxides.

The position and quantity of the oxyethylene units in the oxyalkylene chains of the new polyethers can also affect the percentage elongation at break of the resulting foams when produced with one particular formulation. Relatively low figures showing little or no improvement over those normally obtained with polyoxypropylene polyols were obtained with polyethers containing low proportions of oxyethylene units (polyether of Example 2). Optimum results were obtained with 6–10% by weight of oxyethylene blocks separated from the hydroxyl end groups by the addition of some 5–10% by weight of oxypropylene units.

Foams of good, even cell structure with acceptable porosity were obtained with the polyether of Example 8 which was of somewhat lower molecular weight than the polyethers of Examples 2–7. The foam formulation used was identical with that described for Foam 1 of Table 2 and the T.D.I. index was 108.

A slight increase was made in the Dabco catalyst level (to 0.2 part by weight/100 parts by weight of polyether) in order to achieve a balanced formulation for foaming the polyether of Example 9. The resulting foam produced under similar conditions to that described for Foam No. 1 in Table 2, was of fine, even cell structure causing little or no restriction to the passage of air through a section of the material. The foam possessed good tensile strength and high elongation at break.

EXAMPLE 12

A prepolymer was prepared from the polyether of Example 1, in the following manner:

1000 grams of this polyether (hydroxyl value—47.4 mg. KOH/mg.; water content=0.047%) was placed in a 2 litre flanged reaction vessel and sufficient water added (0.53 ml.) to raise the water content to 0.1% by weight. A flanged reactor head having a stirrer and seal, thermometer pocket and inlet and outlet tubes to enable a slow stream of dry nitrogen to flow above the reactants, was fitted to the reactor. The polyether was stirred for 15 minutes until the water had completely dissolved. 87.3 gms. of 80/20 toluene diisocyanate (5% excess over stoichiometric equivalent) was added to the polyether with stirring. A slow stream of dry nitrogen was passed above the reaction mass and the temperature raised by means of a heating mantle to 105° C. over a period of 40 minutes.

A temperature of 105° C. was maintained for 70 minutes during which the time viscosity of the prepolymer had reached 320 centipoises. Sufficient 80/20 toluene diisocyanate (266 gms.) was added to ensure a final free isocyanate content of 9.2–9.4%. Stirring was continued for a further five minutes, followed by cooling to 25° C.

The free isocyanate content of the resulting prepolymer was 9.3%, the initial viscosity of the prepolymer was 10,300 cps. at 25° C. rising to 11,500 cps. after 6 days and 12,000 cps. after 16 days.

The prepolymer product from the above reaction was foamed using the following formulation Component A: Parts by weight
   Prepolymer (from polyether of
     Example 1) _____ 100
   Silicone oil (polydimethylsiloxane
     of 50 c.st.) _____ 0.3
Component B:
   Water (30% excess over theoretical for
     9.3%—NCO content) _____ 2.5
   Triethylamine _____ 0.3
   N-methyl morpholine _____ 1.0

The prepolymer (400 parts), mixed with the silicone oil (1.2 parts) Component A was contacted with the aqueous catalyst solution (15.2 parts) Component B adn cast into a cardboard carton. The foam rose to maximum height in 2½ minutes. Initial curing was effected at 80° C. for 15 minutes, followed by crushing and a 3 hour period at 120° C. The resulting foam possessed a good cell structure and was extremely rubbery and resilient.

We claim:
1. A polyurethane polymer prepared by reacting a mixture of polyether polyols with a polyfunctional compound selected from the group consisting of polyfunctional organic isocyanates and polyfunctional organic isothiocyanates of general formula

$$R(NCX)_{n+1}$$

where R is an organic radical, X is an atom of an element selected from the group consisting of oxygen and sulphur, and $n$ is a positive integer; said mixture of polyether polyols having molecular weights in the range of 1000 to 6000 and at least two hydroxy groups per molecule, said ethers being copolymers of ethylene oxide, 1:2 propylene oxide, and a polyhydric alcohol having from two to six hydroxy groups, in which copolymers the propylene oxide residues are present in an amount of from 80 to 97% by weight of the total ethylene oxide and propylene oxide residue content of the molecules and in which the terminal blocks of the molecules contain only propylene oxide residues in an amount of at least 3% by weight of the total ethylene and propylene oxide residue content of the molecules.

2. A polyurethane as claimed in claim 1 wherein the polyether polyols contain penultimate blocks of ethylene oxide residues only in an amount of from 6 to 10% by weight of the total ethylene oxide and propylene oxide residue content of the molecules, and terminal blocks of only propylene oxide residues only in an amount of from 5 to 10% by weight of the total ethylene oxide and propylene oxide residue content of the molecules.

3. A polyurethane as claimed in claim 1 wherein the polyether polyols are diols having molecular weights of from 1000 to 3000, contain ethylene oxide residues in an amount of from 5 to 10% by weight of the total ethylene oxide and propylene oxide residue content of the molecules, and contain terminal blocks of only 1:2 propylene oxide residues in an amount of from 5 to 15% by weight of the total ethylene oxide and propylene oxide residue content of the molecules.

4. A polyurethane as claimed in claim 1 wherein the polyether polyols are triols having molecular weights of from 2500 to 4500, contain ethylene oxide residues in an amount of from 5 to 20% by weight of the total ethylene oxide and propylene oxide residue content of the molecules, and contain terminal blocks of only 1:2 propylene oxide residues in an amount of from 5 to 15% by weight of the total ethylene oxide and propylene oxide residue content of the molecules.

5. A polyurethane as claimed in claim 1 wherein the polyether polyols are triols having molecular weights of from 2700 to 4000, and contain penultimate blocks of ethylene oxide residues only in an amount of from 6 to 10% by weight of the total ethylene oxide and propylene oxide residue content of the molecules, and terminal blocks of only propylene oxide residues in an amount of from 5 to 10% by weight of the total ethylene oxide and propylene oxide residue content of the molecules.

References Cited

UNITED STATES PATENTS 3,238,273   3/1966   Hampson et al. _____ 260—2.5

FOREIGN PATENTS 1,309,892   10/1962   Great Britain.
  967,444   8/1964   Great Britain.
  974,169   11/1964   Great Britain.
1,025,242   4/1966   Great Britain.
1,048,312   11/1966   Great Britain.

DONALD E. CZAJA, *Primary Examiner.*

G. W. RAUCHFUSS, H. S. COCKERAM,
                               *Assistant Examiners.*